(No Model.) 6 Sheets—Sheet 1.
C. E. PATRIC & F. R. PACKHAM.
GRAIN DRILL.

No. 404,108. Patented May 28, 1889.

(No Model.) 6 Sheets—Sheet 2.

C. E. PATRIC & F. R. PACKHAM.
GRAIN DRILL.

No. 404,108. Patented May 28, 1889.

Fig. 2.

Witnesses
Isaiah Richards
John W. Hulick.

Inventors
Charles E. Patric
and Frank R. Packham
By Paul A. Staley
Atty (No Model.) 6 Sheets—Sheet 3.

C. E. PATRIC & F. R. PACKHAM.
GRAIN DRILL.

No. 404,108. Patented May 28, 1889.

Witnesses
Isaiah Richards
John W. Hailick

Inventors
Charles E. Patric
Frank R. Packham
By their Attorney (No Model.) 6 Sheets—Sheet 4.
C. E. PATRIC & F. R. PACKHAM.
GRAIN DRILL.

No. 404,108. Patented May 28, 1889.

Witnesses
Isaiah Richards
John W. Hulick

Inventors
Charles E. Patric
and Frank R. Packham
By (No Model.) 6 Sheets—Sheet 6.

C. E. PATRIC & F. R. PACKHAM.
GRAIN DRILL.

No. 404,108. Patented May 28, 1889.

Witnesses
Isaiah Richards
John W. Hulick.

Inventors
Charles E. Patric
And Frank R. Packham
By

UNITED STATES PATENT OFFICE.

CHARLES E. PATRIC AND FRANK R. PACKHAM, OF SPRINGFIELD, OHIO, ASSIGNORS TO THE SUPERIOR DRILL COMPANY, OF SAME PLACE.

GRAIN-DRILL.

SPECIFICATION forming part of Letters Patent No. 404,108, dated May 28, 1889.

Application filed October 29, 1888. Serial No. 289,433. (No model.)

*To all whom it may concern:*

Be it known that we, CHARLES E. PATRIC and FRANK R. PACKHAM, citizens of the United States, residing at Springfield, in the county of Clark and State of Ohio, have invented certain new and useful Improvements in Grain-Drills, of which the following is a specification.

Our invention relates to improvements in grain-drills, and it especially relates to that class of drills known as "shoe-drills."

The object of our invention is to provide a drill which shall be adapted to various kinds of soil and capable of ready adjustment, so that the grain may be planted at the proper depth and under the proper conditions most favorable to the soil and climate in which the machine is to be used.

Our invention consists in the constructions and combinations of parts hereinafter described, and pointed out in the claims.

In the accompanying drawings, which form a part of this specification, Fig. 12 is a sectional elevation showing the arrangement of the supporting-frame in connection with the tongue and lifting and pressure attachment. Fig. 13 is an elevation, partly in section, showing the arrangement of the tongue and its adjusting mechanism in detail. Fig. 13<sup>A</sup> is a plan view of Fig. 13. Fig. 14 is a side elevation in detail of a portion of the lifting and pressure device.

Like parts are indicated by similar letters of reference throughout the several views.

In the said drawings, A represents the main frame, supported on a driving-shaft, A′, which carries the driving-wheels $A^2$ $A^3$, in the ordinary manner. A hopper, B, is supported on the main frame and is provided with the usual feeding devices, which secure their motion from one or both the driving-wheels in a well-known manner, this part of the device forming no part of the invention.

Figure 2:
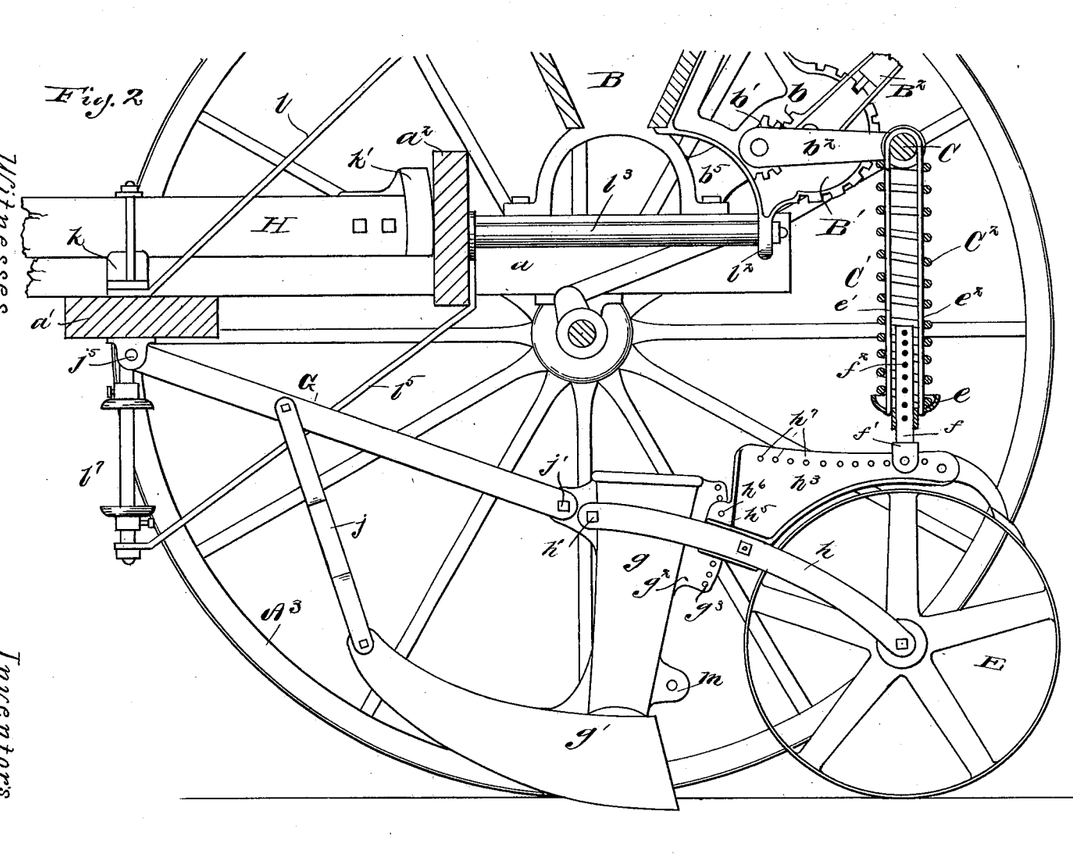
Fig. 2 is a sectional elevation of a portion of the same, showing the arrangement of the shoes with the gage or covering device, together with the adjustable pressure device therefor.
Figures 12, 13, 13A, 14:
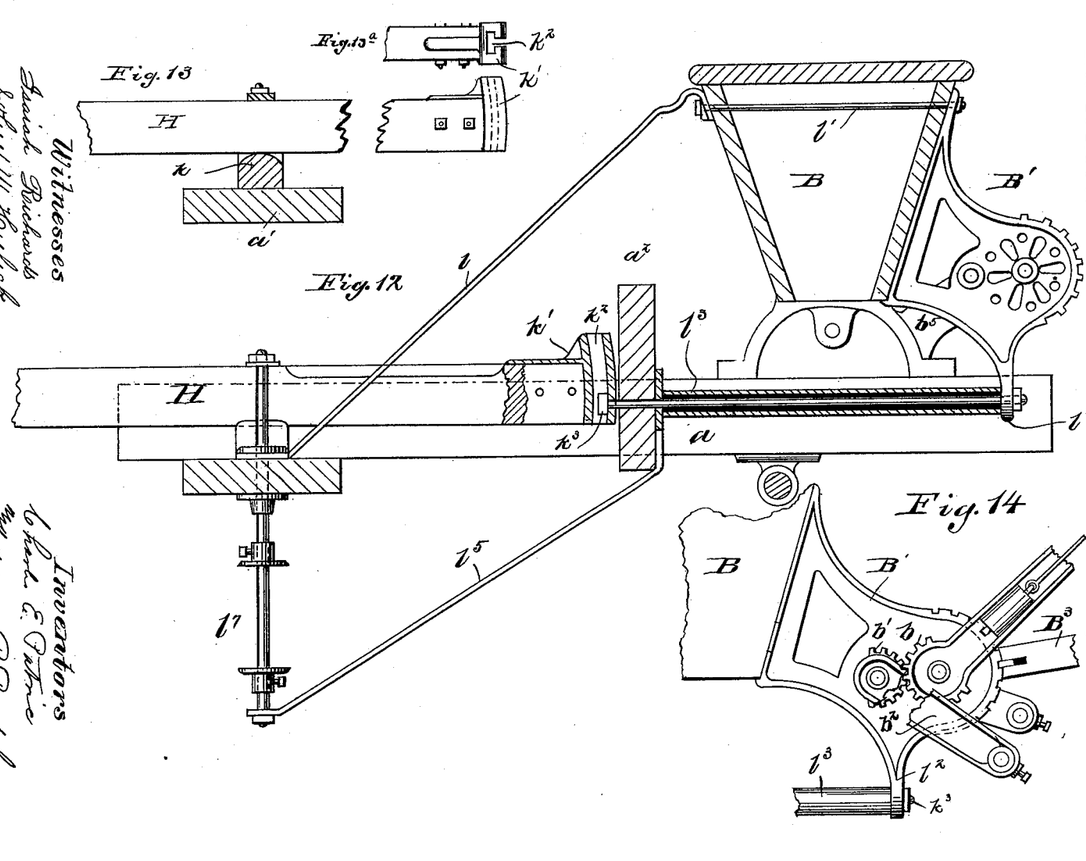
Figure 15:
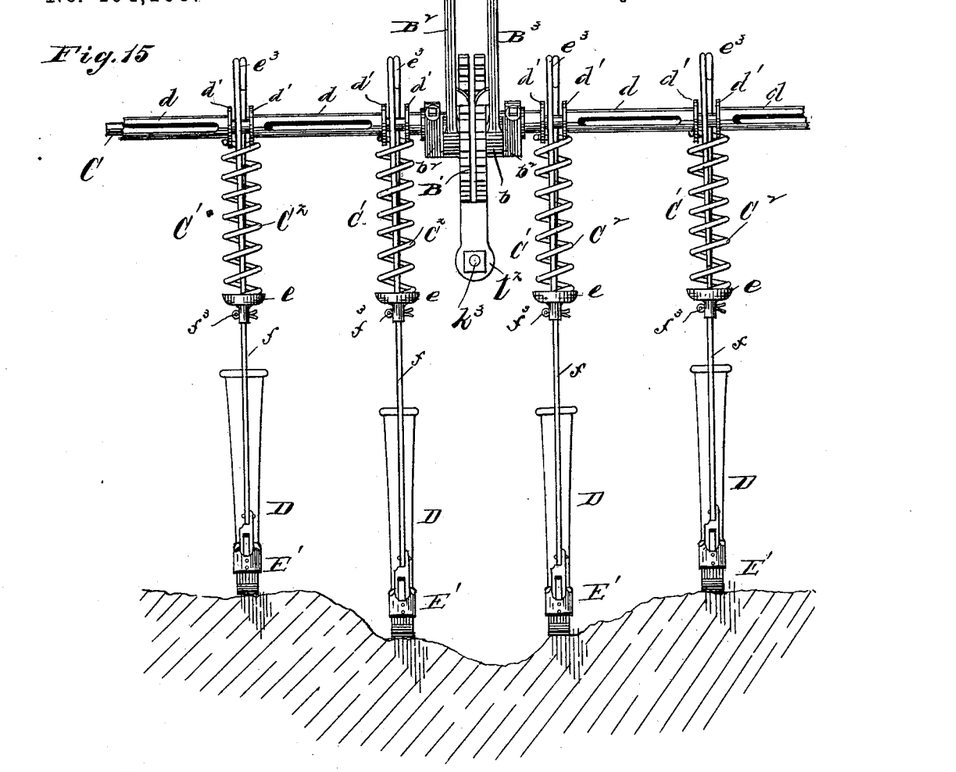
Fig. 15 is a rear elevation of the shoes and pressure device, illustrating some of the adjustments of the same.

The main frame consists of the end rails, $a$ $a$, front bar, $a'$, and the center or intermediate bar, $a^2$. The hopper B rests at each end upon the end rails $a$ $a$. Secured to the rear of the hopper, at or near the middle thereof, is a ratchet or supporting-stand, B′, on either side of which are journaled or pivoted lifting-levers $B^2$ $B^3$. These lifting-levers are each provided at their lower extremity with segments, $b$, of gear-teeth, adapted to engage with similar segments, $b'$, on crank-arms $b^2$, also journaled or pivoted to the ratchet-stand B′ in such a manner that a movement of the lifting-levers $B^2$ $B^3$ produces a movement of the crank-arms $b^2$ in the opposite direction, each of the said lifting-levers and its crank-arm being independent of the other in their movements. Extending from the respective crank-arms $b^2$ in either direction toward the ends of the frame are straight shafts or pressure-bars C, attached at their outer ends to crank-arms $b^3$, similar to the inner crank-arms, $b^2$, the outer crank-arms being journaled in suitable bearings, $b^5$, preferably cast rigid with the supporting-legs of the hopper B, as shown in Figs. 2 and 12.

At intervals along the pressure-bar C are loops or stirrups C', having springs, preferably of coiled steel wire, C², which stirrups are connected to the respective shoes, as hereinafter more fully described, one stirrup and spring being used for each shoe with which the drill is provided.

Each of the lifting-levers B² and B³ is provided with a suitable spring-bolt and latch adapted to engage in one of a series of notches in the ratchet-stand B', so that the same may be held in different positions of adjustment, means being thus provided for regulating the position of the pressure-bar with reference to the springs C², stirrups C', and the shoes, in the manner hereinafter more fully described.

Figures 3, 5, 7, 8:
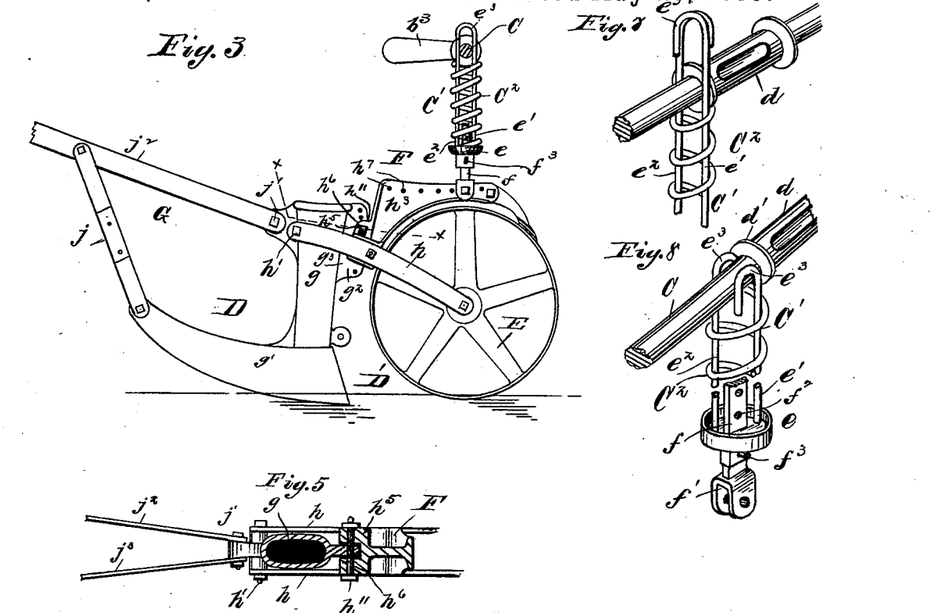
Fig. 3 is a side elevation of a shoe with a gage attachment in the form of a wheel, showing the said attachment used directly as a gage to regulate the depth of the planting.
Fig. 5 is a section on the line $x$ $x$ in Fig. 3.
Figs. 7 and 8 are detail views in perspective, showing the arrangement of the pressure-springs with reference to the pressure-bar.

Located on the pressure-bar C, between the respective stirrups C', we provide sleeves $d$, having at each end collars or flanges $d'$, each adapted to engage in the upper end of one of the springs C² and thus hold said springs in position, and at the same time form means of holding the stirrups C' in the proper position over the shoes and at suitable intervals along the pressure-bar C. Each of the stirrups is provided at the lower end with a spring-cap, $e$, to which the lower end of the stirrup is attached and between which and the pressure-bar C the springs are adapted to rest. The stirrups C' are made in two parts, $e'$ and $e^2$, preferably of steel wire or other suitable material, each formed at the upper end with a hook, $e^3$, as shown in Figs. 7 and 8, the respective hooks being bent in opposite directions, so as to lie adjacent to and parallel with each other. By this construction the end of the stirrup is closed above the pressure-bar C, while at the same time means are provided for readily inserting said stirrups in place over said bar by turning the stirrups to an unusual position and forcing the hooks apart, as shown in Fig 8, in which position they will slip over the bar, after which they spring to the position shown in Fig. 7 and remain firmly attached to said bar.

Extending upwardly through the cap $e$ of each of the stirrups C' is a connecting rod or bar, $f$, preferably bifurcated at the lower end, as shown at $f'$, and adapted to be connected to the shoe attachment, as hereinafter more fully set forth. The upper portion of the connecting-bar $f$, which extends through the cap $e$, is provided with a series of holes, $f^2$, through which a pin, $f^3$, is adapted to be inserted to connect the said bar to the cap $e$ in different positions.

The shoes D are connected in the usual position under the hopper B to the main frame A, each of the shoes being made with the hollow portion $g$, through which the grain is adapted to pass from the feeding mechanism and the blade or runner $g'$ in the usual manner.

Figures 4, 6:
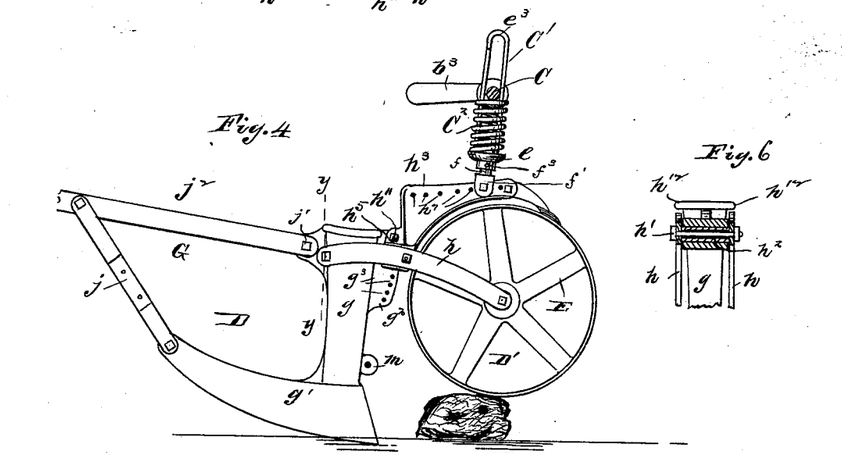
Fig. 4 is a side elevation of the same, showing the gage or covering attachment connected loosely to the shoe and used as a presser or covering device, the view being adapted for illustrating the manner of passing over obstacles.
Fig. 6 is a sectional view on the line $y$ $y$ in Fig. 4.

Connected to the shoe D and adapted to follow the same is a presser or gage attachment, D', adapted to serve the double purpose of gaging the depth to which the grain is to be planted and pressing the earth above the grain, so that the earth, where the soil is light, will be retained in a proper position to insure the sprouting of the grain. This presser or gage attachment we provide in two different forms to suit the soil in which the planting is to occur. In one form we use a wheel, E, and in the other a spring-bar, E'. When the wheel E is used, it is attached to the hoe at a point a little to the rear of the point of the attachment of the drag-bar (hereinafter more fully referred to) by means of a hanger, F, having the traction-bars $h$ at either side, between which the wheel E is adapted to turn. The traction-bars $h$ are pivoted to the shoe D, as shown in Fig. 6, by means of a small bolt, $h'$, which passes through a sleeve, $h^2$, in an opening in the said shoe, the bolt $h'$ being adapted to draw the traction-bars $h$ tightly against the ends of the sleeve $h^2$, which is slightly longer than the bearing in the shoe D, in which it is adapted to turn freely. The hanger F is provided with an upwardly and backwardly extending bearing-support, $h^3$, secured to the traction-bars $h$, and provided with a bifurcated portion, $h^5$, adapted to slide on either side of a web or rib, $g^2$, on the rear of the hollow portion $g$ of the shoe D, the outer surface of said rib being formed on the arc of a circle struck from the center of the sleeve to which the traction-bars $h$ are attached.

The rib or flange $g^2$ is provided with a series of openings, $g^3$, while the bearing-support $h^3$ has a small opening, $h^6$, adapted, as the hanger F is moved along the said flange, to come opposite one of said openings $g^3$. The bearing-support $h^3$ of the hanger F is also provided at the top with a series of openings, $h^7$, with which the bifurcated portion of the connecting-bar $f$, above referred to, is adapted to be connected.

When working under normal conditions the connecting-bar $f$ is preferably connected to the hanger F at a point directly, or nearly so, above the center of the wheel E, as shown in Fig. 3. If it is desired to gage the depth (by means of the said wheel) to which the grain is to be planted, the said wheel is adjusted to the proper relation with said shoe by moving the same on its pivoted bearings $h^2$ and attaching it rigidly to said shoe by a bolt, $h^{11}$, which passes through the hanger F and engages in one of the holes $g^3$ in the rib $g^2$ on said shoe.

As above described, the stirrups C' hang loosely on the pressure-bar C, the springs C² being placed between said pressure-bar and the spring-caps $e$, which form a part of said stirrups. Now, it will be seen that as the pressure-bars are turned downwardly against the springs C², the pressure upon the hanger F may be increased as desired. When the said hanger F is connected rigidly to the shoe D, as just described, the pressure is transmitted to the said shoe and to the gage attachment equally, so that any desired pressure may be obtained upon the shoe and gage device without changing the relative position of the said parts. By having the hanger F extended out from the shoe and over the gage-wheel an increased leverage is secured at the point where the pressure is applied, so that the pressure is more effective than when placed directly over the hoe or between the same and its point of attachment to the frame.

Figure 9:
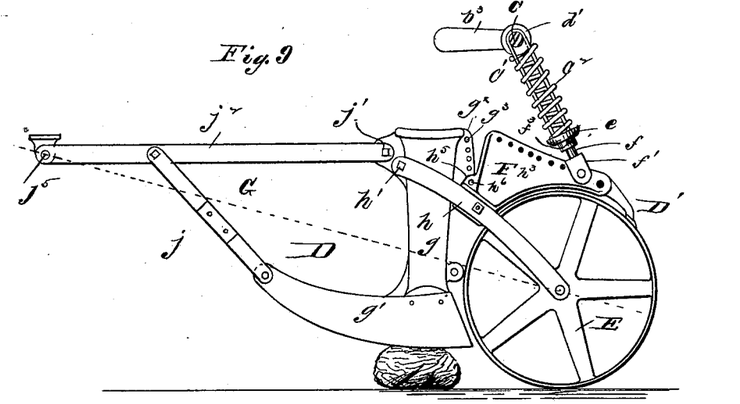
Fig. 9 is a side elevation of a shoe with the covering or presser device, illustrating the operation of the parts when the shoe is passing over an obstruction.

When it is desired to use the gage or presser device simply for the purpose of pressing the soil over the planted grain, the pin $h^{11}$ is removed and the device is then allowed to adjust itself independently of the shoe to the inequalities of the ground, as shown in Figs. 4 and 9.

It will be noticed in this connection that by the arrangement of the spring connecting-bar directly over the center of the wheel the pressure of the spring will be adapted to exert itself in a direction to assist the shoe in rising over any obstruction as soon as the same has risen slightly from the ground, while the contrary effect is accomplished after the shoe passes over the obstruction, as shown in Figs. 4 and 9. By connecting the bar $f$ to the bearing-support $h^3$ at the different points indicated by the openings $h^7$ the pressure applied to the spring may be brought more or less on the hoe or on the presser-wheel, as desired.

Figure 16:
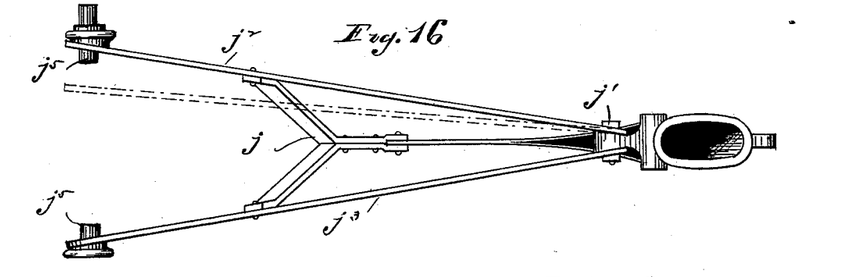
Fig. 16 is a plan view of one of the shoes in detail, showing the attachment of the same to the drag-bars and to the frame.

The shoes are attached to the frame through the medium of drag-bars G, each having a bifurcated connection, $j$, to the point of the shoe in the usual manner. The rear end of each of the drag-bars G is attached to the shoe at a point, $j'$, slightly in front of the connection $h'$ of the traction-bars $h$. The drag-bars G consist, preferably, of two straight bars, $j^2 j^3$, attached securely to the shoe at the point $j'$, so as to project at an angle thereto, as indicated in Fig. 16, that portion of the shoe to which they are attached being formed with angular faces to produce this result. By this construction the drag-bars are held firmly at the shoe end and are adapted at the forward end to be pressed over trunnions $j^5$ on the main frame, the resilience of the metal holding the bars in position thereon, thus furnishing means for readily detaching the same by simply pressing the bars together, as indicated in dotted lines in Fig. 16, until the bar is removed from the said trunnion. In a normal position of the shoe a line drawn from the point of attachment of the front end of the drag-bar through the journal of the presser-wheel E falls between the inner point of connection of the drag-bar and the shoe and the traction-bars $h$ and the shoe; hence the strain on the drag-bars to draw the shoe forward has a tendency to carry the same into the ground until the said points assume a straight line, thus furnishing the means for regulating the depth of planting when the presser device is left free for acting independent of said shoe. As the shoe passes over an obstruction, this difference of centers is considerably magnified, as shown in Fig. 9, so that the moment the shoe has left the obstruction the propelling force applied to the drag-bar draws the shoe down to its normal position. In order to provide for adjusting this angle of draft with reference to the centers of the wheels and drag-bar connections, we support the tongue H upon a curved seat or bearing, $k$, on the front bar, $a'$, and provide at the rear end of the tongue a curved bearing, $k'$, having a T-shaped slot, $k^2$, (see Fig. 13$^\text{A}$,) adapted to receive the head of a fastening-bolt, $k^3$, which secures the same to the center bar, $a^2$, of the drill-frame.

By loosening the fastening-bolt $k^3$ and adjusting the tongue up or down with reference to the center bar, $a^2$, and by turning the same on the curved bearing $k$, means are provided for varying the angle of the tongue with reference to the frame, and thus changing the position of the point of attachment of the front of the drag-bars, which in turn changes the angle of draft to the shoe and presser-wheel, thus regulating the position of the bottom of the said shoe with reference to the said wheel and adjusting the depth of planting.

As above stated, the ratchet-stand B' and the pressure attachment connected thereto are connected to the hopper B. Now, in order to support this device entirely from the hopper and dispense with the additional supports generally used for supporting the lifting and pressure devices, we provide means for relieving the hopper of any torsional strain caused by the raising or lowering of the shoes or by forcing the pressure thereon. This we preferably accomplish by extending a brace, $l$, from the point of attachment of the tongue-bearing $k$ to the hopper B. This brace $l$ is in turn connected to the ratchet-stand B' through the hopper B by a bolt, $l'$. The ratchet-stand B' is provided with a lower extended lug, $l^2$, which is connected to the center bar, $a^2$, by means of the bolt $k^3$, which also serves to hold the tongue in different positions of adjustment, as above described, a sleeve, $l^3$, being provided about said bolt, having one end resting against the lug $l^2$ and the other against a brace, $l^5$, which connects the said center bar to the hitch-rod $l^7$, to which the doubletrees or other form of hitch are secured. By this arrangement the bracket-stand B' is held firmly against movement in either direction from the center bar, $a^2$, and together with the brace $l$ relieves the hopper of any torsional strain in the operation of raising or lowering the pressure devices.

Figure 1:
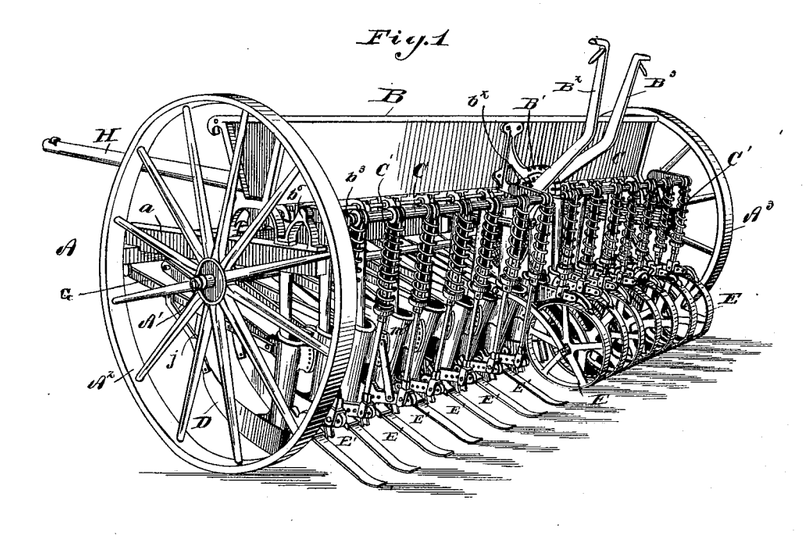
Figure 1 is a perspective view of a grain-drill embodying our invention.
Figure 10:
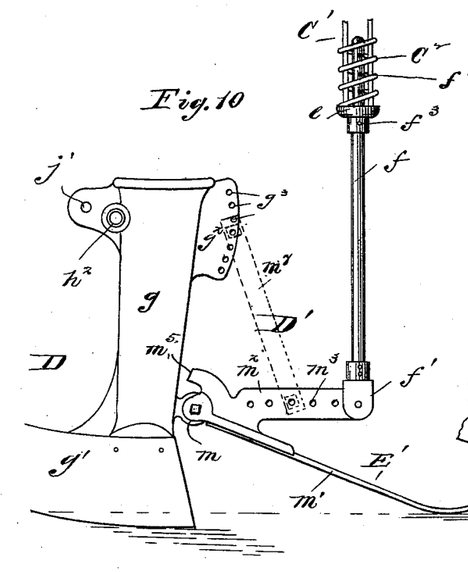
Figs. 10 and 11 are side elevations of a shoe with a modified form of presser or covering device, the same being shown in different positions in the different views.
Figure 11:
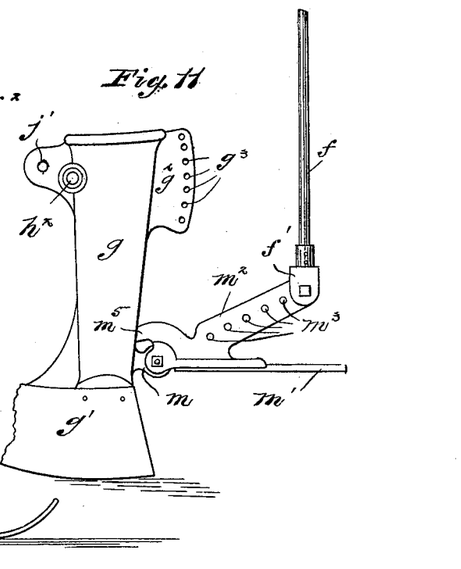

In raising the shoes from the ground it will be understood that the lifting-levers are turned until the pressure-bar C comes to the top of the stirrups C', after which, through the medium of the connecting-bar $f$, the hanger F is raised until the traction-bars $h$ come in contact with projecting flanges $h^{12}$ on the sides of each shoe, and thus raise the said shoe from the ground. In the event that the shoe is attached to the hanger by means of the pin $h^{11}$, as above described, the shoe and wheel will be raised together. By the arrangement of the segments on the ends of the lifting-levers, in connection with the gear-teeth on the ends of the rocker-arms attached to the pressure-bar, it will be seen that the pressure-bar moves in the opposite direction to the said levers; hence in raising the hoes from the ground the lifting-levers move in an opposite direction to that in which the drill is going when in operation, thus enabling the operator to lift the shoes much more readily than when lifting in the same direction in which the drill is going. When it is desired to use the presser-feet $E'$ in place of the wheels $E$, the hanger $F$ is disconnected from the shoe at the point $h'$ and the presser-feet $E'$ connected to lugs $m$, provided on the rear of said shoes for this purpose. The presser-foot $E'$ consists, preferably, of a single bar, $m'$, of steel or other resilient metal, which may be attached to a projecting arm or support, $m^2$, provided with openings $m^3$, adapted to receive a bolt or pin to attach the connecting-bar $f$. When it is desired to connect the presser-feet $E'$ rigidly to the hoe, a small bar, $m^7$, is extended from the support $m^2$ to the flange $g^2$, as indicated in Fig. 1 and in dotted lines in Fig. 10. A stop projection, $m^5$, on the support $m^3$ is adapted to come against the rear portion of the shoe as the presser-foot is raised, as shown in Fig. 11, when not connected to the flange $g^2$, and thus raise the shoe from the ground. By this construction the same adjustment may be secured for the presser-feet as for the presser-wheel, and either or both may be used on the same machine.

By having openings $f^2$ in the upper end of the connecting-rod $f$, and a pin, $f^3$, adapted to connect the said rod or bar to the stirrup $C'$, we are enabled to adjust the position of the said stirrups with reference to the said bar, and thus adjust the position of the respective shoes with reference to the pressure-bars independently of each other. This is particularly advantageous when, as is frequently the case in the western territories, it is desired to plant longitudinally for a considerable distance along a dead furrow. In such a case one or more shoes, which are to travel in the furrow, may be lowered sufficiently to accommodate them to the unevenness of the ground and be held in this position, while the position of the stirrups with reference to the presser-bar remains unchanged, thus furnishing means for exerting a uniform pressure on all the shoes without regard to their position of adjustment with reference to the surface of the ground.

We have shown two lifting-levers and two pressure-bars for raising and lowering the shoes and applying the pressure. This is the preferable arrangement when a number of shoes are used, as indicated in Fig. 1 of the drawings. It is obvious, however, that one lifting-lever may be adapted to raise and lower and apply the pressure to all the shoes, this being the preferable form when a small number of shoes are used.

Having thus described our invention, we claim—

1. The combination, with a shoe, of a wheel journaled in a hanger which is pivoted to the front of said shoe, a rib or flange on the rear of said shoe, and a guide on said hanger adapted to travel alongside of said flange, substantially as specified.

2. The combination, with a shoe, of a wheel journaled in a hanger pivoted to the front of said shoe, a rib or flange on the rear portion of said shoe, a guide on said hanger adapted to embrace said flange, and means, substantially as described, for connecting said hanger to said flange in different positions of adjustment.

3. The combination, in a grain-drill, of a shoe attached by drag-bars to the main frame of said drill and a wheel journaled in a hanger pivoted to said shoe, the centers of the connections between said frame and shoe and said shoe and wheel being such that the bottom of the shoe shall stand below said wheel when said connections are in a straight line, substantially as specified.

4. The combination, in a grain-drill, with a shoe having a drag-bar attached to the frame, of a wheel journaled in a hanger pivoted to said shoe, so that the connecting-points between the shoe and the frame and the shoe and wheel shall be in a straight line when the shoe is slightly below said wheel, and means, substantially as described, for adjusting the frame of the drill to change the position of the point of attachment between the drag-bar and frame, substantially as specified.

5. The combination, with a shoe, of a gaging and pressing attachment pivoted thereto and provided with a rigid bearing-support, a pressure-bar with stirrups and springs, as described, and a connecting-bar from said springs and stirrups to said presser attachment, means for connecting said presser attachment rigidly to said shoe, and means, substantially as described, for adjusting the position of said connecting-bar on said bearing-support, substantially as specified.

6. The combination, with a shoe, of a gaging and pressing attachment pivoted thereto, a flange on said shoe having a series of openings through which said pressing attachment may be attached to said shoe in different positions of adjustment, and a bearing-support on said pressing attachment having a series of openings, whereby the lifting and pressure bar may be connected at different positions to said pressing attachment, substantially as specified.

7. The combination, with the pressure-bar and the lifting-levers adapted to operate the same, of the stirrups and springs thereon, said stirrups being formed in two parts having the hook-shaped ends adapted to be slipped over said pressure-bar, substantially as specified.

8. The combination, with the pressure-bar and a lifting-lever adapted to operate the same, stirrups on the said bar, springs about said stirrups, and shoes under said stirrups, of connecting-bars attached to said stirrups and to said shoes, and means, substantially as described, for adjusting said connecting-bars with reference to said stirrups to move the shoes to or from the said pressure-bar without changing the tension of the said springs, substantially as specified.

9. The combination, with the pressure-bar, the stirrups thereon, and the springs about said stirrups at right angles to said pressure-bar, of sleeves on said pressure-bar, each provided with end flanges thereon adapted to separate the said sleeves and engage in the ends of the said springs and hold the same in position about said stirrups, substantially as specified.

10. The combination, with a series of grain-drill shoes and a pressure-bar connected thereto, of the rocker-arms attached to said pressure-bar, one of said arms being provided with gear-teeth thereon, a lifting-lever having a segment of gear-teeth adapted to engage with the teeth on said rocker-arm, and a ratchet-stand on which said lever is journaled, substantially as and for the purpose set forth.

11. The combination, in a grain-drill, of the lifting-lever and pressure-bar, said lever being provided with a segment adapted to engage with teeth on the arm of said pressure-bar, a ratchet-stand secured to the hopper and adapted to support said lifting-lever and bar, and a sleeve and connecting-bolt extending from said ratchet-stand to the drill-frame, substantially as specified.

12. The combination, with the drill-frame and hopper, of a ratchet-stand secured to said hopper adapted to support the lifting-lever, a brace from said frame connected through said hopper to said ratchet-stand, a sleeve between said frame and ratchet-stand below said hopper, and a bolt or rod connecting said frame and ratchet-stand through said sleeve, substantially as specified.

13. The combination, with the shoes having the drag-bars attached rigidly thereto at one end, so as to project at an angle, as described, of the trunnions on the frame, to which said drag-bars are adapted to be attached, said bars being formed of resilient metal and adapted to spring over said trunnions, substantially as specified.

14. The combination, with the shoes having the angular faces to which the drag-bars are attached, of the drag-bars formed of resilient metal, secured to said angular faces so as to project at an angle, as described, and trunnions on the main frame, with which said bars are adapted to engage, said bars being held in position on said trunnions by the resilience thereof, substantially as set forth.

15. The combination, with the hopper and the ratchet-stand attached thereto, of the pressure-bars having crank-arms at either end thereof, one of the crank-arms of each bar being journaled to said ratchet-stand and provided with gear-teeth, lifting-levers having gear-teeth adapted to engage the teeth in said crank-arms, stirrups on said pressure-bars, springs on said stirrups, and connecting-rods from said stirrups to the shoes, substantially as set forth.

16. The combination, with a pressure-bar and its operating-lever, of the stirrups formed in two parts of resilient metal, springs on said stirrups, sleeves on said pressure-bar between said stirrups, said stirrups having flanges at the ends adapted to engage said springs, and connecting-rods from said stirrups to the drill-shoes, substantially as set forth.

17. The combination, in a grain-drill, of a shoe with a pressing and gaging wheel attached to and adapted to follow said shoe, a hanger in which said wheel is journaled, having a bearing-support connected rigidly to said hanger over said wheel, variable pressure-springs over said hanger, and means for connecting said springs to said bearing-support at different points, substantially as specified.

18. The combination, with a shoe having a gage and pressing attachment pivoted thereto, of a pressure-bar having a stirrup and spring thereon above said pressing attachment, and an independent bar connecting said pressing attachment to said stirrup, whereby said pressing attachment may be adjusted to or from said pressure-bar without changing the tension of said springs, said connecting-bar being provided with a series of openings adapted to receive the connecting pin or bolt which secures the same to the said stirrup, substantially as specified.

19. The combination, with a series of grain-drill hoes and a pressure-bar having the stirrups and springs arranged above said hoes, one stirrup and spring for each hoe, of independent bars connecting said stirrups to the respective hoes, and means, substantially as described, for changing the point of connection between the respective stirrups and bars to adjust the hoes to or from the pressure-bar without changing the tension of the spring, substantially as and for the purpose set forth.

In testimony whereof we have hereunto set our hands this 25th day of October, A. D. 1888.

CHARLES E. PATRIC.
FRANK R. PACKHAM.

Witnesses:
ISAIAH RICHARDS,
JOSHUA SCOTT.